(12) United States Patent
Dalton et al.

(10) Patent No.: US 9,277,836 B2
(45) Date of Patent: Mar. 8, 2016

(54) COOKWARE

(75) Inventors: Graham Robert Brett Dalton, Auckland (NZ); David Moodie, Wellington (NZ)

(73) Assignee: AGD HOLDINGS LIMITED, Auckland (NZ)

( * ) Notice: Subject to any disclaimer, the term of this patent is extended or adjusted under 35 U.S.C. 154(b) by 0 days.

(21) Appl. No.: 13/806,750

(22) PCT Filed: Jun. 24, 2011

(86) PCT No.: PCT/IB2011/052768
§ 371 (c)(1),
(2), (4) Date: Apr. 8, 2013

(87) PCT Pub. No.: WO2011/161648
PCT Pub. Date: Dec. 29, 2011

(65) Prior Publication Data
US 2013/0200080 A1  Aug. 8, 2013

(30) Foreign Application Priority Data

Jun. 24, 2010 (NZ) .......................................... 586407
Nov. 23, 2010 (NZ) .......................................... 589454

(51) Int. Cl.
*A47J 45/10* (2006.01)
*A47J 27/00* (2006.01)
(Continued)

(52) U.S. Cl.
CPC ................. *A47J 27/002* (2013.01); *A47J 37/10* (2013.01); *A47J 37/101* (2013.01); *A47J 45/071* (2013.01)

(58) Field of Classification Search
CPC ....... A47J 27/002; A47J 45/00; A47J 45/071; A47J 45/07; A47J 45/077; A47J 45/078; A47J 45/06; B65D 25/10

USPC ......... 220/573.1, 759, 752, 754–757; 16/425, 16/422, 430
See application file for complete search history.

(56) References Cited

U.S. PATENT DOCUMENTS

| D110,117 S | 6/1938 | Weis |
|---|---|---|
| D174,431 S | 4/1955 | Jepson |

(Continued)

FOREIGN PATENT DOCUMENTS

| AU | 135949 S | 12/1998 |
|---|---|---|
| AU | 324405 S | 2/2009 |

(Continued)

OTHER PUBLICATIONS

Franch Military Aluminum Mess Kit from Colemans Military Surplus LLC, http://store.colemans.com/cart/french-military-aluminum-mess-kit-2-pack-p-2684.html, retrieved Sep. 16, 2014, 1 page.

*Primary Examiner* — Anthony Stashick
*Assistant Examiner* — Raven Collins
(74) *Attorney, Agent, or Firm* — Kilpatrick Townsend & Stockton LLP

(57) ABSTRACT

A cookware assembly or set comprising or including at least one cookware vessel of a substantially square peripheral exterior and interior form when viewed in plan, wherein the vessel has an attachment location on at least one of the four sides, the attachment location being a relief in the vessel's rim suitable for handle engagement, and a handle selectively engageable at the or any one of the attachment locations, the handle with both proximal and distal end regions having a pair of jaw elements at the proximal region for facilitating engagement to an attachment location such that a first jaw of the jaw pair locates substantially inside the vessel and a second jaw of the jaw pair locates substantially outside of the vessel, and a lid able to fit on the cookware vessel and to close, or at least substantially close, the cookware vessel.

17 Claims, 17 Drawing Sheets

(51) Int. Cl.
*A47J 37/10* (2006.01)
*A47J 45/07* (2006.01)

(56) References Cited

U.S. PATENT DOCUMENTS

| | | |
|---|---|---|
| D181,246 S | 10/1957 | Boldt |
| 3,384,195 A | 5/1968 | Jepson et al. |
| D245,059 S | 7/1977 | Bardin |
| D246,884 S | 1/1978 | Rinke |
| D256,420 S | 8/1980 | Rice et al. |
| D262,104 S | 12/1981 | Simpson |
| D363,002 S | 10/1995 | Douglas |
| D387,177 S | 12/1997 | Davis |
| 5,704,092 A * | 1/1998 | Nicollet et al. ............... 16/425 |
| 6,393,973 B1 | 5/2002 | Velo et al. |
| 6,439,420 B1 | 8/2002 | Park |
| D540,122 S | 4/2007 | Wasserman et al. |
| D555,419 S | 11/2007 | Reckert et al. |
| D578,352 S | 10/2008 | Hauser |
| 2005/0145637 A1 | 7/2005 | Lin |
| 2008/0290090 A1* | 11/2008 | Kindler et al. ............ 220/203.05 |
| 2009/0039096 A1* | 2/2009 | Lorthioir ........................ 220/759 |
| 2010/0230319 A1* | 9/2010 | Thomson ........................ 206/514 |

FOREIGN PATENT DOCUMENTS

| | | |
|---|---|---|
| AU | 2010100465 A4 | 6/2010 |
| AU | 334406 S | 12/2010 |
| FR | 2244435 A1 | 4/1975 |
| FR | 2287884 A2 | 5/1976 |
| JP | 2001-157634 | 6/2001 |
| WO | 2007-048261 A1 | 5/2007 |
| WO | 2007-101924 A3 | 9/2007 |
| WO | 2008061092 A1 | 5/2008 |
| WO | 2009-092741 A1 | 7/2009 |

\* cited by examiner

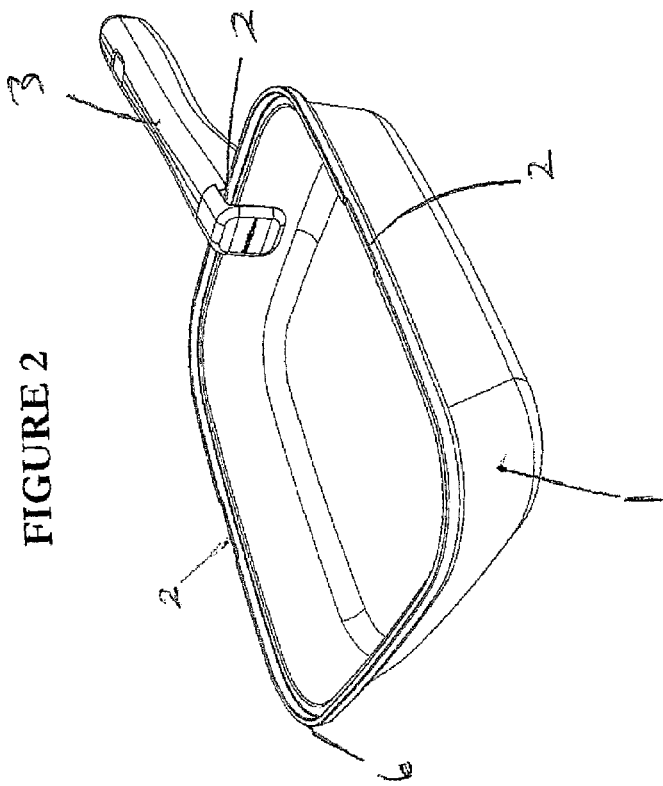
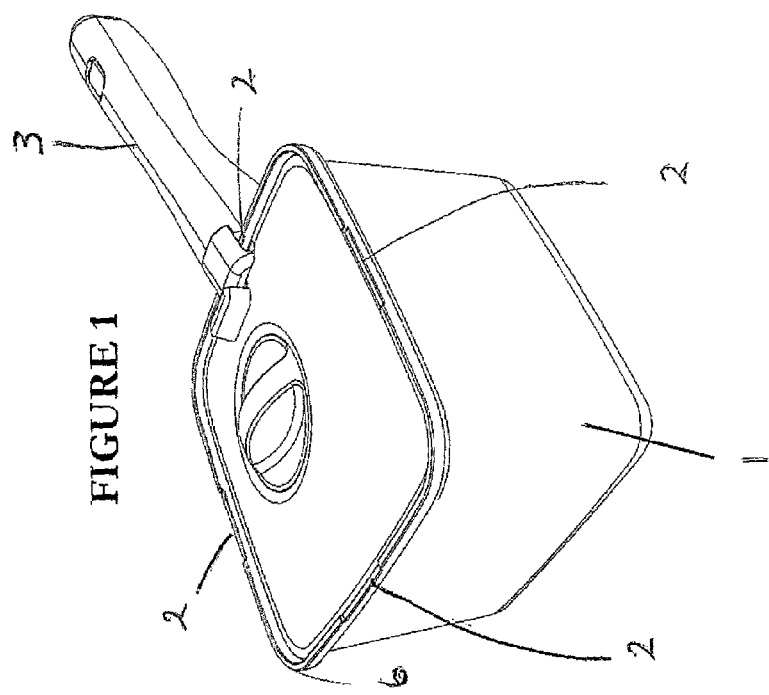

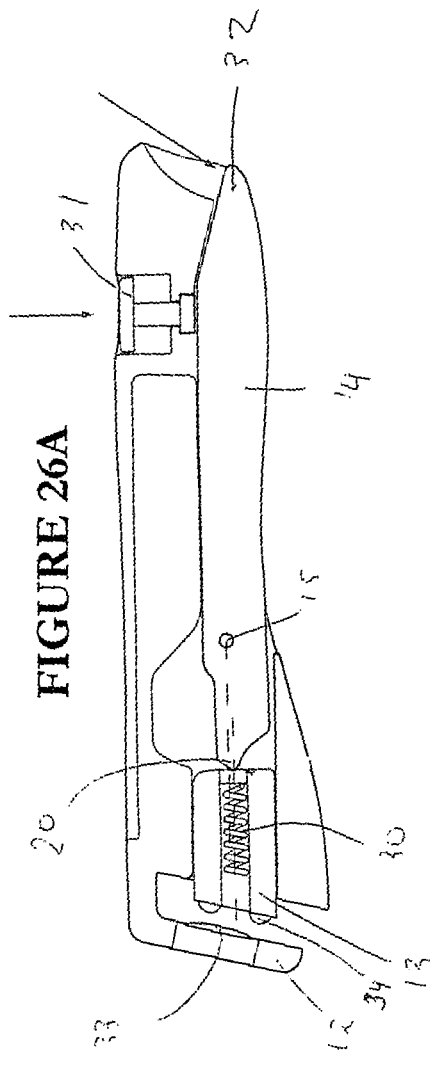
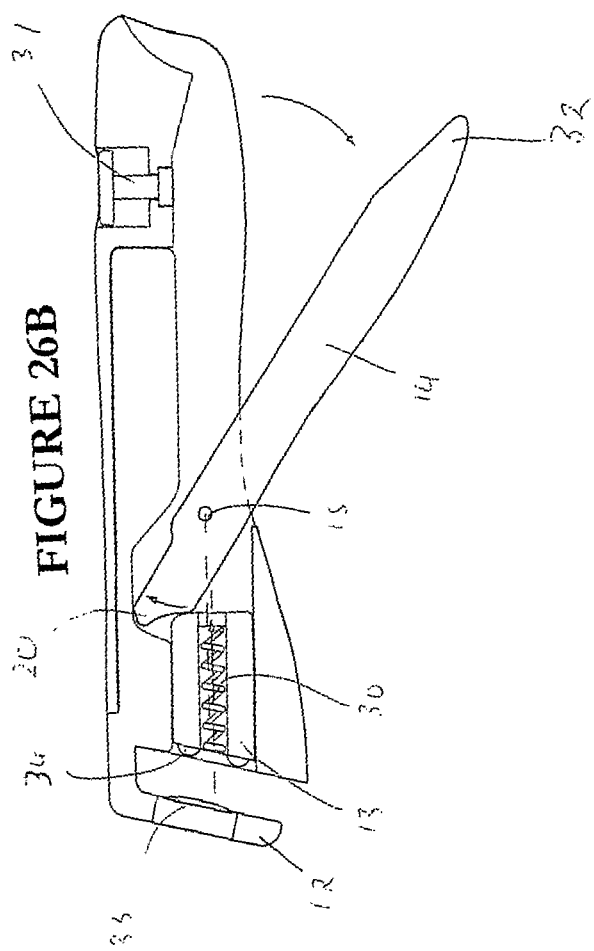
FIGURE 26A
FIGURE 26B

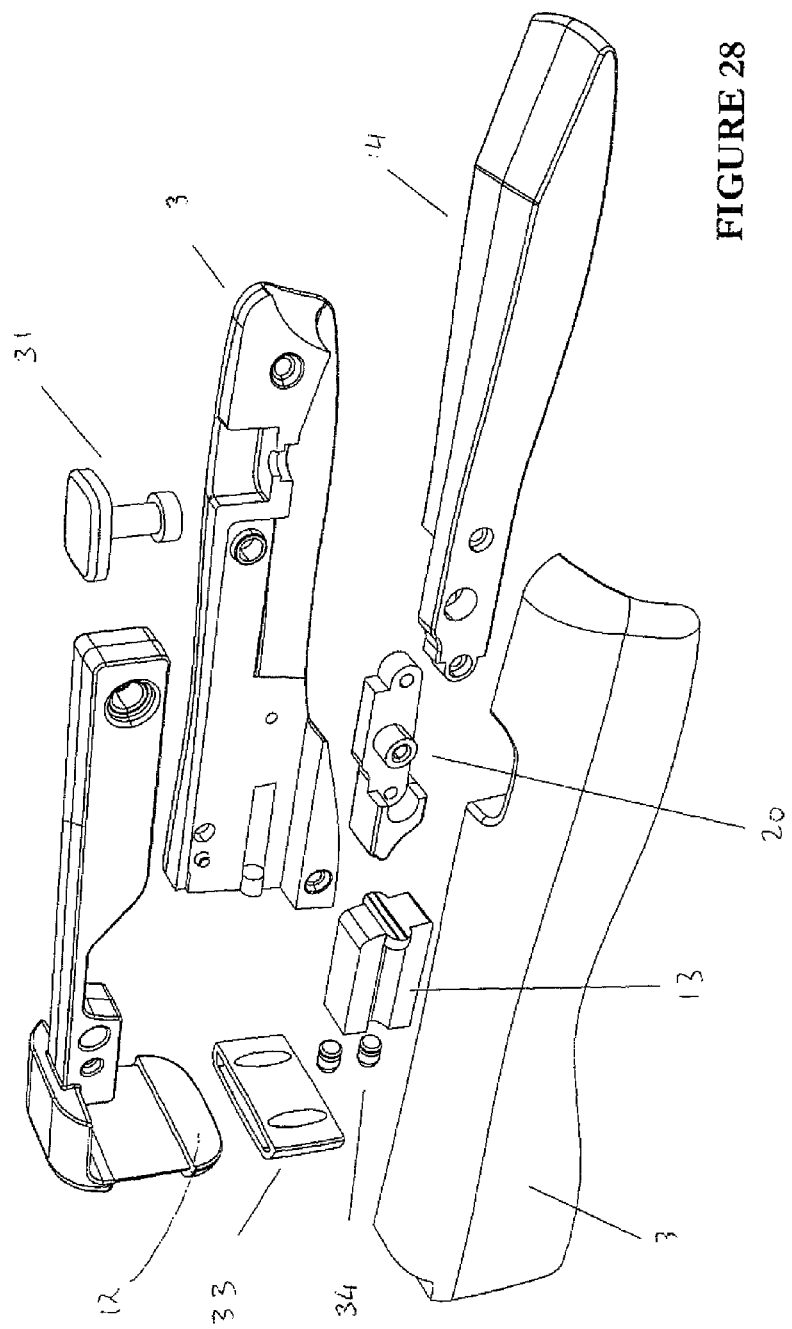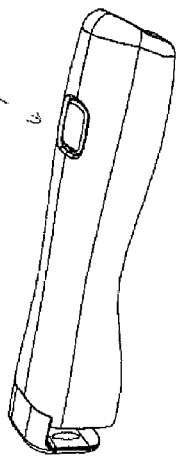

COOKWARE

This application is a U.S. National Phase under 35 USC 371 of PCT Application No. PCT/IB2011/052768 filed Jun. 24, 2011, which claims priority to New Zealand Application No. 586407, filed Jun. 24, 2010, and New Zealand Application No. 589454, filed Nov. 23, 2010, the disclosures of which are incorporated by reference herein.

FIELD OF THE INVENTION

The present invention relates to cookware. More particularly but not exclusively it relates to space saving cookware.

BACKGROUND

Typical cookware items such as pots and pans with fixed handles are sometimes large and cumbersome and are difficult to stow efficiently. In some situations, such as in apartments boats, caravans etc there may be limited space available to store cookware. Typical cookware does not lend itself for use in situations in which there is limited space for storage.

It is an object of the present invention to provide improved cookware which overcomes or at least partially ameliorates some of the abovementioned disadvantages or which at least provides the public with a useful choice

BRIEF DESCRIPTION OF THE INVENTION

In a first aspect the present invention consists in a cookware assembly or set comprising or including:

at least one cookware vessel of a substantially square peripheral exterior and interior form when viewed in plan, wherein the vessel has an attachment location on at least one of the four sides, the attachment location being a relief in the vessel's rim suitable for handle engagement, and a handle selectively engageable at the or any one of said attachment locations, the handle with both proximal and distal end regions having a pair of jaw elements at the proximal region for facilitating engagement to an attachment location such that a first jaw of the jaw pair locates substantially inside the vessel and a second jaw of the jaw pair locates substantially outside of the vessel, and a lid able to fit on the cookware vessel and to close, or at least substantially close, the cookware vessel.

Preferably the cookware vessel is of a form to enable nesting at least in part with a like vessel of a smaller or larger size, if not also partially nestable with one of the same size.

Preferably a plurality of like cookware vessels may sequentially nest, one within the other in order of their size, for efficient stowage.

Preferably each cookware vessel may sequentially nest, one within the other in order of their size, even with a corresponding lid located on each nested vessel.

Preferably each lid has a handle located substantially centrally of the lid body and has a grippable region extending upwardly substantially beyond the lid body, and a hollow region located below the grippable region, wherein the hollow region is dimensioned so that it can receive at least a portion of the grippable region of another like lid placed beneath so as to prevent interference between the lid handle and another lid when a plurality of cookware vessels are sequentially nested with their lids located thereon.

Preferably the position of one or both jaws of the jaw pair may be adjusted between a locked condition where the jaws are closer together than a further apart unlocked condition.

Preferably the handle has a lever to cause adjustment of the jaws between the locked and unlocked conditions.

Preferably the lever can articulate between at least two stable conditions, one of which positions corresponds to the locked condition of the jaw pair, the other corresponding to the unlocked condition of the jaw pair.

Preferably the articulation of the lever causes a sliding and/or otherwise guided member as a second jaw element to move relative to a more proximal fixed jaw element.

Preferably the jaw pair are shaped such that they are complementary with the attachment location to lock the handle to the vessel in a rigid, weight bearing manner.

Preferably the second jaw of the jaw pair engages under the relief feature of the rim.

Preferably the relief in the rim restricts movement of an attached handle along the rim of the vessel.

Preferably the lid includes a relief substantially on its periphery to accommodate the handle when such is engaged at an attachment location.

Preferably the lid includes a slideable member able to encroach over the relief to reduce venting during cooking.

Preferably the slideable member can encroach over the relief to such an extent that the lid can substantially seal the vessel to which the lid is associated.

In another aspect the present invention consists in a handle suitable for attachment to a cookware vessel, the handle comprising or including:

a pair of jaw elements at a proximal region of the handle, an actuator to adjust the relative position of the pair of jaw elements, wherein the relative position of the jaw elements facilitates attachment of the handle to an attachment location provided as a relief in the rim of a cookware vessel such that a first jaw of the jaw pair locates substantially inside the vessel and a second jaw of the jaw pair locates substantially outside of the vessel.

Preferably the position of one or both jaws of the jaw pair may be adjusted between a locked condition where the jaws are closer together than a further apart, unlocked condition.

Preferably the actuator is a lever to cause adjustment of the jaws between the locked and unlocked conditions.

Preferably the lever can articulate between at least two stable conditions, one of which positions corresponds to the locked condition of the jaw pair, the other corresponding to the unlocked condition of the jaw pair.

Preferably the articulation of the lever causes a sliding and/or otherwise guided member as a second jaw element to move relative to a more proximal fixed jaw element.

Preferably the lever has a cam profile that engages the sliding member, the arrangement being such that, via articulation of the lever, the cam profile can be pivoted outwardly from a condition that stably holds the sliding member in a locked condition closer to the first mentioned jaw yet allows the retreat of the sliding member to an unlocked condition under the action of a bias when the cam is moved or urged away from that condition.

Preferably the sliding member is biased towards the cam profile of the lever.

Preferably the jaw pair are shaped such that they are complementary with the attachment location of the cookware vessel to lock the handle to the vessel in a rigid, weight bearing manner.

In another aspect the present invention consists in a lid for, or suitable for, a cookware vessel of a substantially square or rectangular peripheral exterior and interior form when viewed in plan, save optionally for rounded transitions between the adjacent sides, said lid being an assembly defining a lid body having a relief on its periphery that accords to a centre of a side of such a cookware vessel, a slide or other moveable member carried by the lid body able to close the relief, and a handle feature of the lid carried by the lid body.

Preferably the handle is located substantially centrally of the lid body and has a grippable region extending upwardly substantially beyond the lid body, and a hollow region located below the grippable region, wherein the hollow region is dimensioned so that it can receive at least a portion of the grippable region of another like lid placed beneath so as to prevent interference between the lid handle and another lid when a plurality of cookware vessels are sequentially nested with their lids located thereon.

Preferably the slideable member can encroach over the relief to such an extent that the lid can substantially seal a vessel to which the lid is associated.

In another aspect the present invention consists in a cookware vessel that includes at least one handle attachment location defined on the rim of the vessel, the handle attachment location being suitable for selective attachment of a handle, wherein the handle attachment location is recessed from the surrounding rim to restrict movement of an attached handle along the rim of the vessel.

Preferably the cookware vessel is of a form to enable nesting at least in part with a like vessel of a smaller or larger size, if not also partially nestable with one of the same size.

Preferably a plurality of like cookware vessels may sequentially nest, one within the other in order of their size, even with a corresponding lid located on each vessel.

In another aspect the present invention consists in a cookware assembly or set comprising two or more cookware vessels and lids corresponding to each cookware vessel, wherein each lidded cookware vessel is sequentially nested, or may sequentially nest, one within the other, or another, in order of their size in an efficient manner.

Preferably a handle engageable to either, or any, of the vessels is located in the smaller or smallest vessel.

In a another aspect aspect the present invention is, in combination or as a set, at least one cookware vessel of a substantially square peripheral exterior and interior form when viewed in plan, optionally and preferably having rounded transitions between the adjacent sides, and of a form nestable at least in part with a like vessel of a smaller or larger size, if not also partially nestable with one of the same size, and wherein the vessel has a attachment location for handle engagement on at least two of the four sides, and a handle selectively engageable at any one of said attachment locations by placing a jaw of its jaw pair inside the vessel and the complementary jaw outside of the vessel thereby to cantilever or otherwise carry the vessel's weight, or at least part of its weight, from the handle.

Preferably the jaws of the jaw pair are moveable in a longitudinal direction with respect to one another to facilitate attachment and locking of the handle to the vessel.

Preferably the jaws of the jaw pair are shaped such that they are complementary with the attachment location to lock the handle to the vessel in a rigid, weight bearing manner.

Preferably the more outward of the jaws of the jaw pairs is latched and/or biased to keep a shoulder (or equivalent) under a lip or other feature of the location zone outwardly of the vessel which presents a co-acting shoulder (or equivalent) in the other direction.

Preferably the location is provided by a set down from the side.

In another aspect the invention consists in, in combination, as a subassembly or as an assembly, at least one cookware vessel of substantially square or rectangular peripheral exterior and corresponding interior form when viewed in plan, optionally having rounded transitions between the adjacent sides, and of a form having at least one side provided with a relief in a rim feature in order to accommodate a complementary handle feature, a lid able to fit on the cookware vessel and to close, or at least substantially close, the cookware vessel, and a handle selectively engageable to the cookware vessel at the region of said rim relief but at least in part intrusively of part of the general envelope of the lid, or the vessel to be lidded, when viewed in plan.

Preferably the lid includes a moveable member able to cover the gap from the general envelope of the lid in plan to an extent necessary to close any vent opening between either or both (i) the lid body proper and any inserted handle or (ii) the lid body proper and the relief in said rim feature, or (iii) both.

Preferably said relief in the rim feature of at least one side is repeated on at least one other side but there is substantial sealing of at least one such relief feature past the lever.

Preferably the relief is of a form herein depicted.

Preferably the cookware has, as its rim, a form defining an outward downwardly facing shoulder below a peripheral upper plateau (save for the zones lowered to provide for optional handle location), and an inwardly facing surface from the peripheral upper plateau down to an upwardly facing ledge on which a lid can or is to (directly or indirectly) seat.

In another aspect the present invention may broadly consist in a cookware vessel that includes at least one handle attachment zone defined on the rim of the vessel, the handle attachment zone being suitable for selective attachment of a handle, wherein the handle attachment zone is recessed from the surrounding rim to restrict movement of an attached handle along the rim of the vessel.

Preferably the vessel is suitable for the attachment of handles of a type that include:

a knob at one end of the handle body, a tongue member extending from the handle body at the same end as the knob to define a slot between the tongue member and the knob, wherein the relative position of the tongue member and the knob facilitates attachment of the handle to the attachment zone of the cookware vessel.

Preferably the handle attachment zone is suitable to be received in the slot of a handle.

Preferably a handle attachment zone is positioned on each side of the vessel.

Preferably, when attached to a said handle, at least some of the weight of the vessel is cantilevered from the handle due to the attachment of the handle and the vessel.

Preferably the knob and tongue are shaped such that they are complementary with the attachment zone to lock the handle to the vessel in a rigid, weight bearing manner.

Preferably said cookware vessel is of a shape such that it can efficiently nest with like cookware vessels when no handles are attached thereto.

Preferably the vessel is manufactured from one of the following combination of materials:

stainless steel exterior (magnetized for induction), copper or aluminium inside and a stainless steel interior, or stainless steel with an aluminium base (disk) stamped on, or annodised aluminium exterior and stainless steel interior.

Preferably the vessel is Teflon coated.

In another aspect the invention consists in a lid for, or suitable for, a cookware vessel having a general envelope to contact (directly or indirectly) that accords to a cookware vessel of substantially square or rectangular peripheral exterior and interior form when viewed in plan, save optionally for rounded transitions between the adjacent sides, said lid being an assembly defining a lid body having a relief from one perimeter of its envelope that accords to a centre of a side of such a cookware vessel, a slide or other moveable member carried by the lid body able to close the relief from the general envelope of the lid, and a handle feature of the lid carried by the lid body.

Preferably the lid is of a form as hereinafter described.

In a further aspect the invention consists in a handle suitable for attachment to a cookware vessel, said handle being of the form substantially as hereinafter described with or without reference to any one, some or all of the accompanying drawings.

In yet a further aspect the invention consists in a handle suitable for attachment to a cookware vessel, the handle having an articulating member biased by a bias means whereby it can assume at least two stable conditions, one of which positions holds a sliding and/or otherwise guided member as a second jaw element in closer proximity to a more distal fixed jaw element.

Preferably the arrangement is substantially as hereinafter described.

In still a further aspect the invention consists in a handle assembly comprising or including two handle components to define a handle housing and a distal jaw component (whether present in both of them or only one of them), a slide able to reciprocate as a complementary jaw component for said distal jaw, a cam member pivoted from the housing, and means to bias the slide towards the cam member, the arrangement being such that the cam member can be pivoted outwardly from a condition that stably holds the slide in a utensil gripping position more proximate to the first mentioned jaw yet allows the retreat of the slide under the action of the bias when the cam is moved or urged away from that condition.

In another aspect the present invention consists in a handle suitable for attachment to a cookware vessel, the handle comprising or including:

a knob at one end of the handle body, a tongue member extending from the handle body at the same end as the knob to define a slot between the tongue member and the knob, wherein the relative position of the tongue member and the knob facilitates attachment of the handle to an attachment zone of a cookware vessel.

Preferably the relative position of the tongue and the knob can be adjusted to lock and unlock the handle to a cookware vessel.

Preferably adjustment of the tongue with respect to the knob is in the longitudinal direction relative to the handle body.

Preferably positioning of the tongue with respect to the knob is biased but manipulatable by user input.

Preferably the rim of a cookware vessel can be received in the slot to attach the handle to the vessel.

Preferably a complementary attachment zone of the rim of a cookware vessel is received by the slot.

In another aspect the present invention consists in a lid for a cookware vessel, the lid including a removable band that can be positioned about its perimeter, wherein the band can be fitted to the lid in order to create an airtight seal when the lid is positioned in or onto a complementary cookware vessel.

Preferably the band is removed whilst the cookware vessel is used for cooking, and fitted whiles the cookware vessel is used for storing food.

Preferably the band is silicone rubber.

Preferably the band, when fitted, covers an air vent in the lid.

In another aspect the present invention consists in a cookware vessel substantially as herein described with reference to any one or more of the accompanying drawings.

In another aspect the present invention consists in a handle suitable for a cookware vessel substantially as herein described with reference to any one or more of the accompanying drawings.

In another aspect the present invention consists in a lid for a cookware vessel substantially as herein described with reference to any one or more of the accompanying drawings.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

As used in this specification the term "square" when used to describe cookware vessels should be interpreted as meaning substantially square. It may include other quadrilateral forms such as rectangular forms and may include forms that have rounded edges between adjacent sides.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which:

FIG. 1 shows a cookware vessel with a handle attached,

FIG. 2 shows an alternative cookware vessel with a handle attached,

FIG. 26A shows an alternative handle assembly shown in the locked condition,

FIG. 26B shows the handle assembly of 26A shown in the unlocked condition,

FIG. 27 shows an exploded view of the handle of FIG. 26A and 26B,

FIG. 28 shows a view of the handle of FIG. 27,

DETAILED DESCRIPTION OF THE INVENTION

Figure 3:
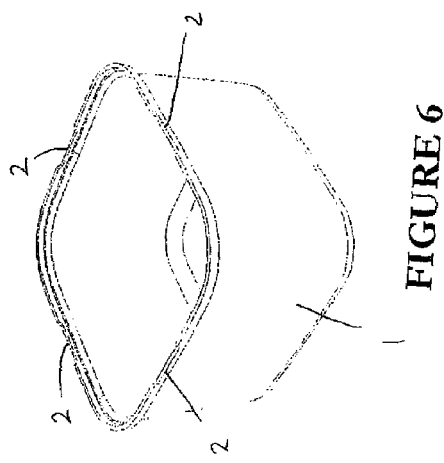
FIG. 3 shows a plan view of the vessel of FIG. 1, and shows the location of the cross section A-A.
Figure 6:
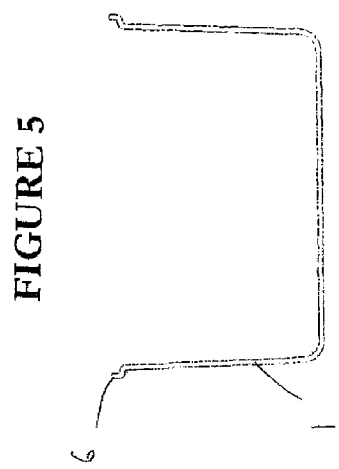
FIG. 6 shows a perspective view of the vessel of FIG. 1.
Figure 4:
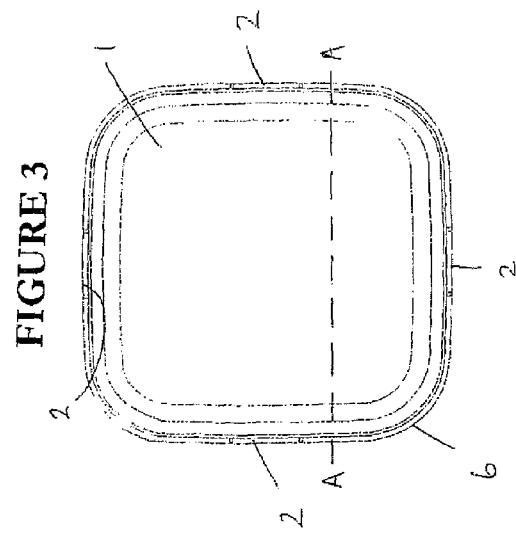
FIG. 4 shows a side view of the vessel of FIG. 1.
Figure 5:
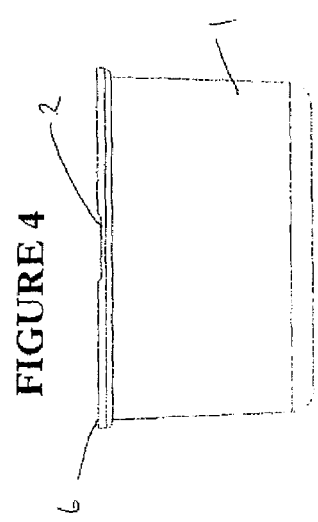
FIG. 5 shows a cross section view through A-A of the vessel of FIG. 1.
Figure 11:
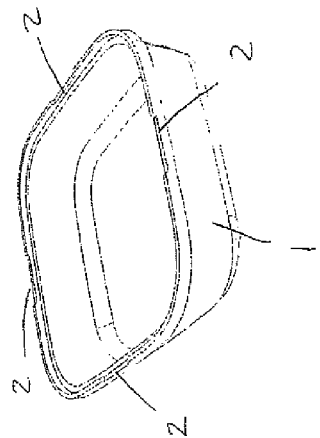
FIG. 11 shows a perspective view of the vessel of FIG. 1.
Figure 10:
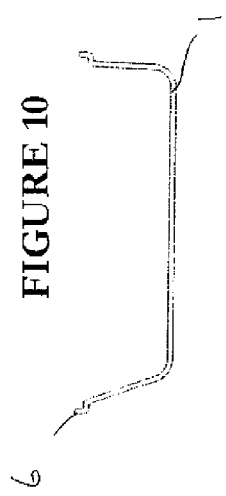
FIG. 10 shows a cross section view through B-B of the vessel of FIG. 1.
Figure 9:
FIG. 9 shows a side view of the vessel of FIG. 2.
Figure 7:
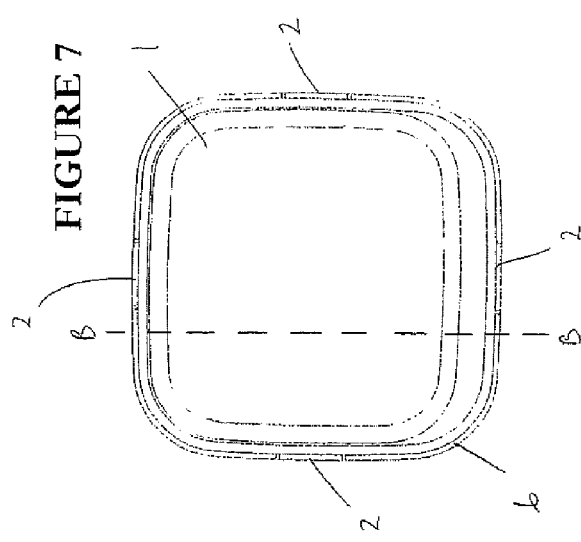
FIG. 7 shows a plan view of the vessel of FIG. 2, and shows the location of the cross section B-B.
Figure 8:
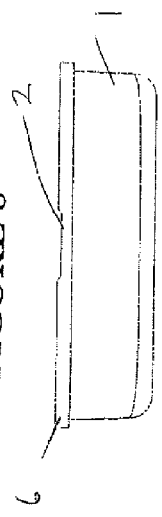
FIG. 8 shows a front view of the vessel of FIG. 2.
Figure 15:
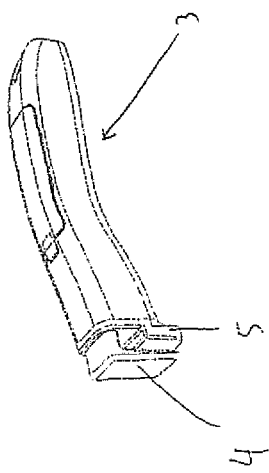
FIG. 15 shows a perspective view of the handle of FIG. 12
Figure 14:
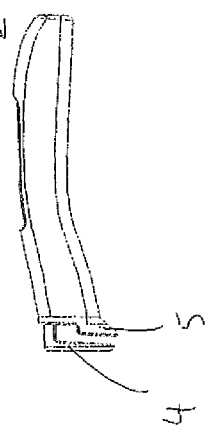
FIG. 14 shows a side view of the handle of FIG. 12.
Figure 12:
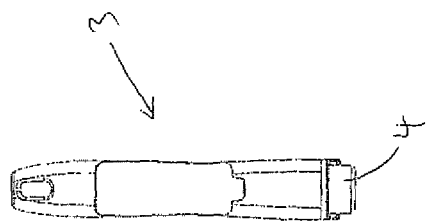
FIG. 12 shows a top view of a handle suitable for a cookware vessel 1.
Figure 13:
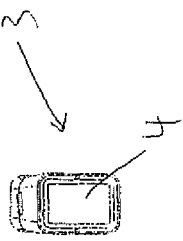
FIG. 13 shows a front view of the handle of FIG. 12.

With reference to FIG. 1 there is shown a cookware vessel 1 of the present invention. The vessel 1 may be of a shape such that it can easily nest with other, like vessels 1. This will enable the efficient storage of a set of vessels 1 which may be particularly important in situations where storage space is at a premium such as in apartments, boats, caravans etc. In the preferred embodiment the vessel 1 is of a generally square plan shape with rounded corners as shown in FIG. 1.

The cookware vessel 1 may be manufactured from any suitable material or combination of materials. Possible combinations of materials are outlined below:

stainless steel exterior (magnetized for induction), copper or aluminium inside and a stainless steel interior, or stainless steel with an aluminium base (disk) stamped on, or annodised aluminium exterior and stainless steel interior.

It should be appreciated that other combinations of materials may also be used. The cookware vessel 1 may or may not include a coating layer such as Teflon or similar. The cookware vessel 1 may or may not be suitable for induction cooking.

The cookware vessel 1 includes at least one handle attachment location 2 which may be an indent in the rim of the vessel 1. Preferably there are four handle attachment locations 2 which are located centrally of each side of the vessel 1. The handle attachment locations 2 are suitable for removable attachment of the handle 3.

When the vessel 1 is not in use, it may be stored in an efficient manner with other, like vessels 1 by removing the handle 3 from the attachment location and nesting the vessel 1 with the other like vessels 1. The complementary shape of the other, like vessels 1 enables the nesting.

FIG. 2 shows an alternatively shaped vessel 1 which may be used as a frying pan for example. The vessel 1 of FIG. 2 only differs in its shape, it may be manufactured from the same materials and may also include four handle attachment locations 2.

FIGS. 3 to 6 show different views of an exemplary cookware vessel 1 of FIG. 1 without the handle 3 attached to an attachment location 2.

FIGS. 7 to 11 show different views of an exemplary vessel 1 (i.e. a frying pan) of FIG. 2 without the handle 3 attached to an attachment location 2.

The handle 3 is shown in more detail in FIGS. 12 to 15. The handle 3 may include a die cast tongue 4 and knob 5. The tongue 4 and knob 5 are positioned relative to one another in a way to facilitate attachment of the handle 3 to an attachment location 2 of a vessel 1. When the handle 3 is attached to the attachment location 2 it is not able to slide along the rim 6 of the vessel 1, this is due to the attachment location 2 being recessed slightly from the rim 6 that surrounds it.

The tongue 4 may be moveable with respect to the knob 5 to allow for attachment to the attachment location 2. Once positioned on the attachment location, relative movement between the tongue 4 and the knob 5 may allow for locking of the handle to the vessel 1.

Figure 16:
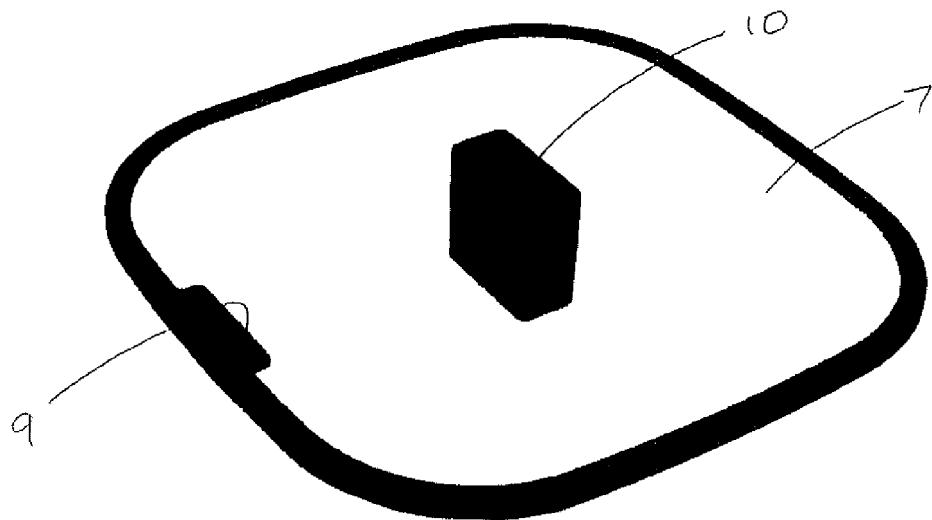
FIG. 16 shows a lid for a vessel with a removable band around its perimeter.
Figure 17:
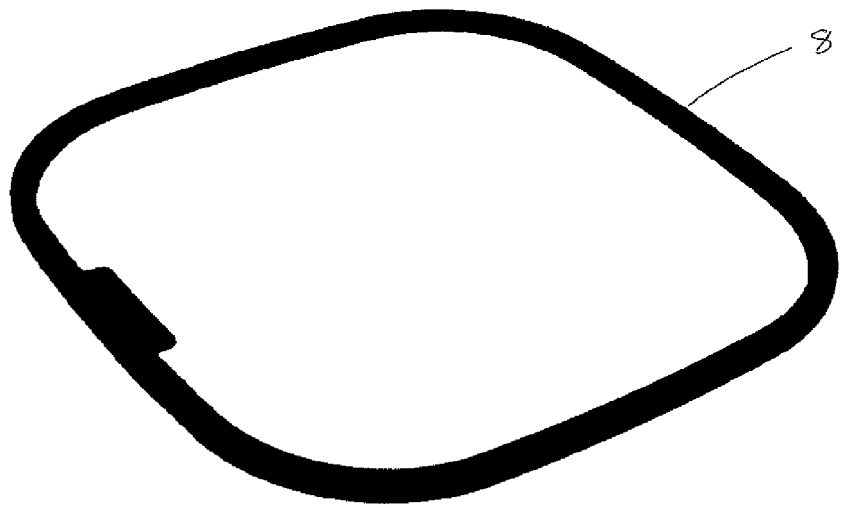
FIG. 17 shows the removable band for use with the lid of FIG. 16.

With reference to FIG. 16 there is shown a lid 7 suitable for use with a vessel 1. The lid may include a band 8 which may be placed around the edge of the lid 7. The band 8 may be silicone or another similar material and helps create a seal with the vessel 1. Sealing the vessel 1 may be particularly important for creating an air tight environment for storing food inside the vessel 1.

The lid 7 may be stainless steel or other suitable material and may include a vent 9, which allows for the venting of gases from the vessel 1 during cooking (i.e. when the band 8 is not located on the lid 7). The band 8 covers the lid vent 9 when it is located on the lid 7.

The lid 7 may also include a handle 10.

The banded lid can be used to cover the vessel during cooling and refrigeration thereby to ensure a partial vacuum can develop above the vessel contained foodstuff.

An alternative embodiment of the handle of the present invention will now be described with reference to FIGS. 18 to 22B.

Figure 18:
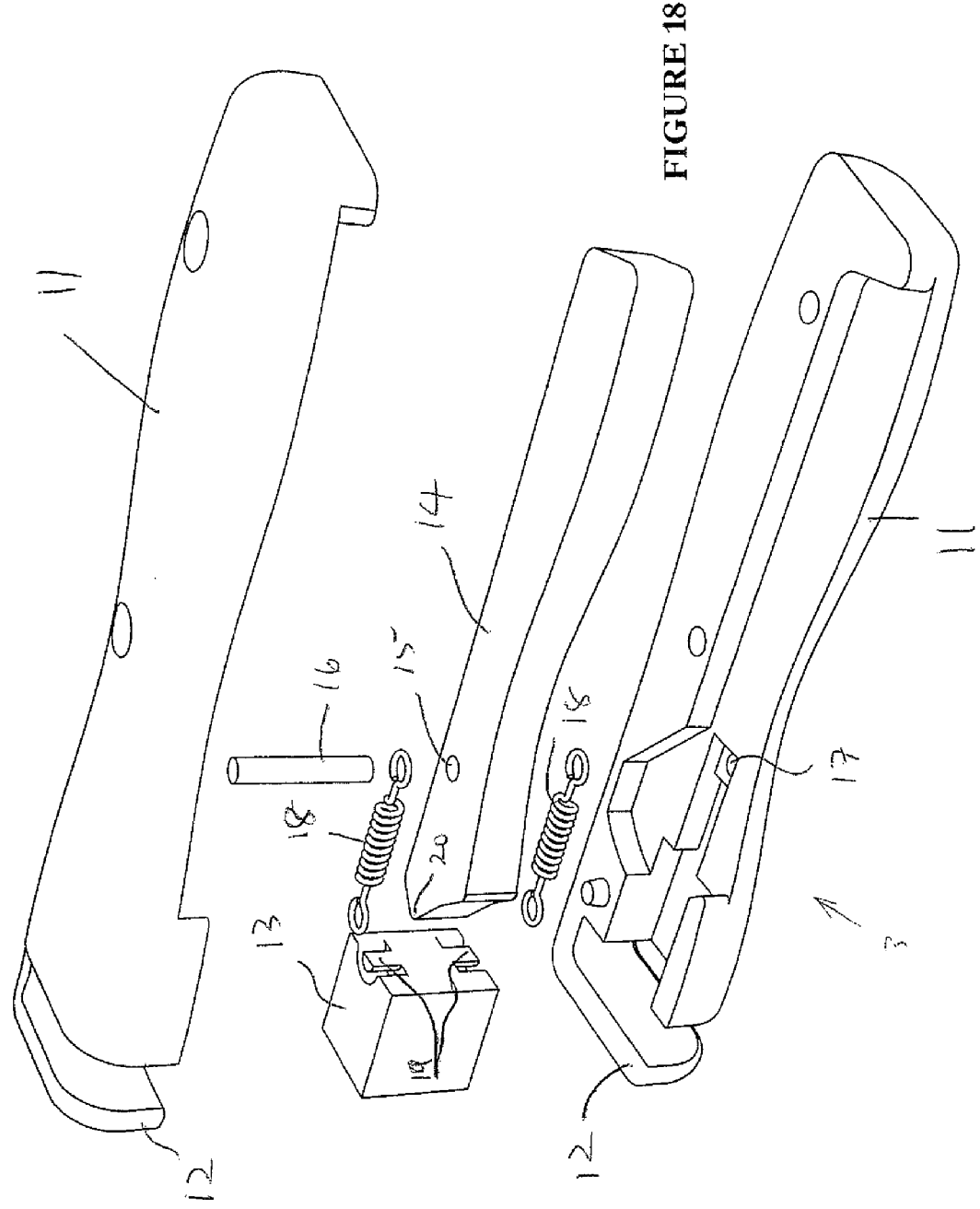
FIG. 18 is an exploded view of yet a different embodiment of handle, one requiring a bias and an over centre capability for a cam acting also as a lever.
Figure 20:
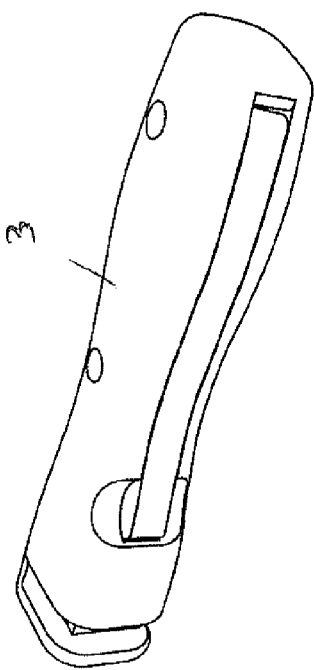
FIG. 20 is a view of the handle of FIG. 19 when viewed in perspective from below.
Figure 19:
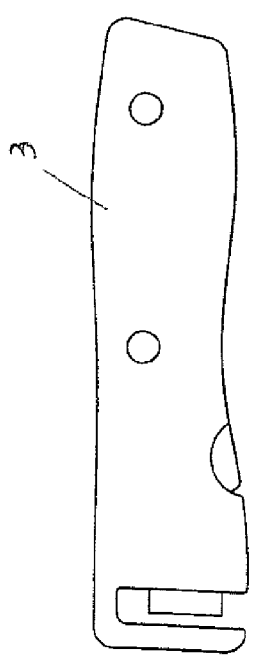
FIG. 19 is a side elevation view of a handle assembled from the components as in FIG. 18 when viewed in side elevation.
Figure 21:
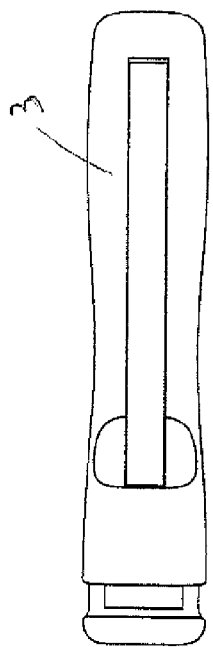
FIG. 21 is a view from below of the handle of FIGS. 19 and 20.

FIG. 18 shows complementary and preferably mirror imaged components however able to be held together to define by preferably a region 12 of each a proximal jaw.

Each of the components 11 when held together in the assembled form such as shown by any suitable screws or other means is adapted to guidably locate a slide 13 and a cam lever 14 to be located by its pivot 15 with a pin 16 from regions such as 17 from each of the components 11. Springs 18 are to act on formations 19 of the slide at one end and on the pin 16 at the other end.

Figure 22:
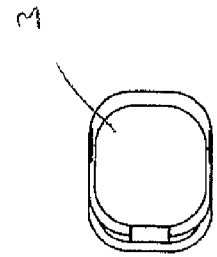
FIG. 22 is an end view of the handle of FIGS. 19 to 21, FIG. 22A and FIG. 22B show a handle substantially of the construction as in FIGS. 18 to 21 (in the case of FIG. 22A) in its dipping condition, and (in the case of FIG. 22B) in its levered open condition (the spring not being shown) which allows the biased retreat of the secondary jaw member to act as a jaw or as a jaw-like insertion under a shoulder of the vessel.
Figure 22A:
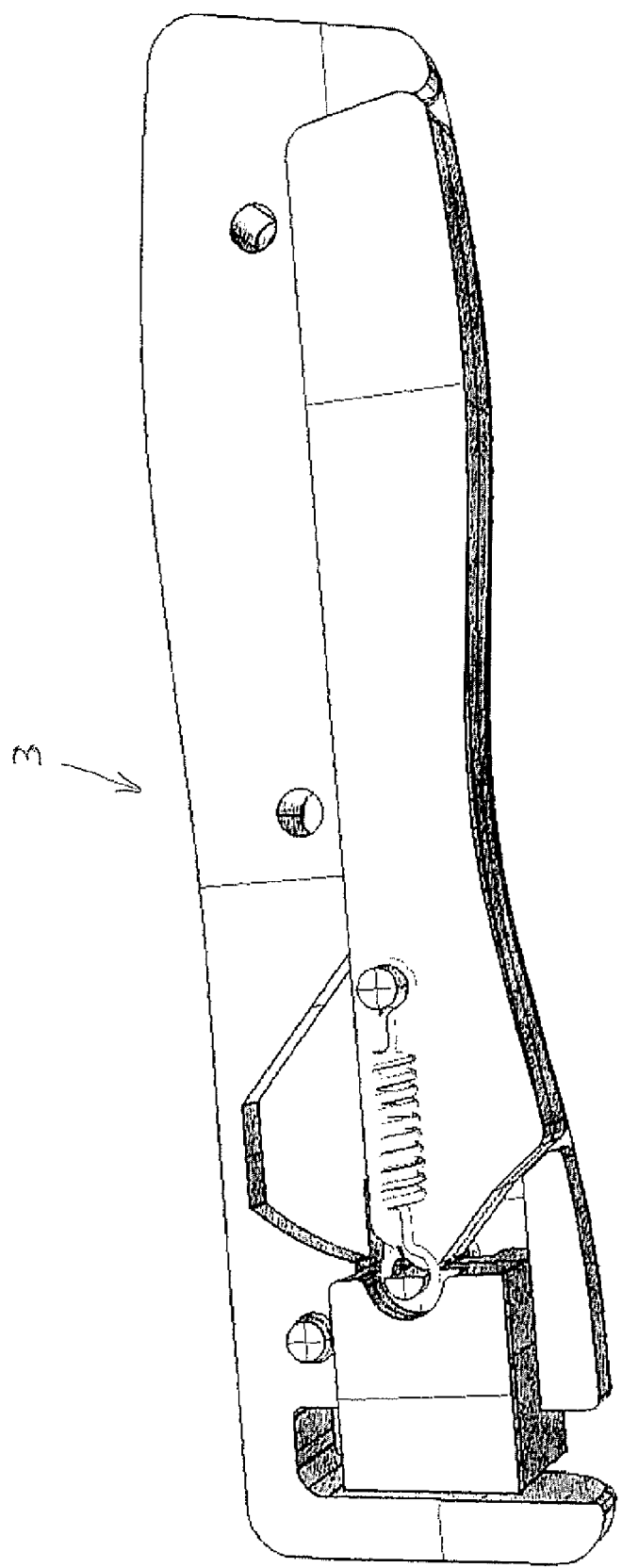
Figure 22B:
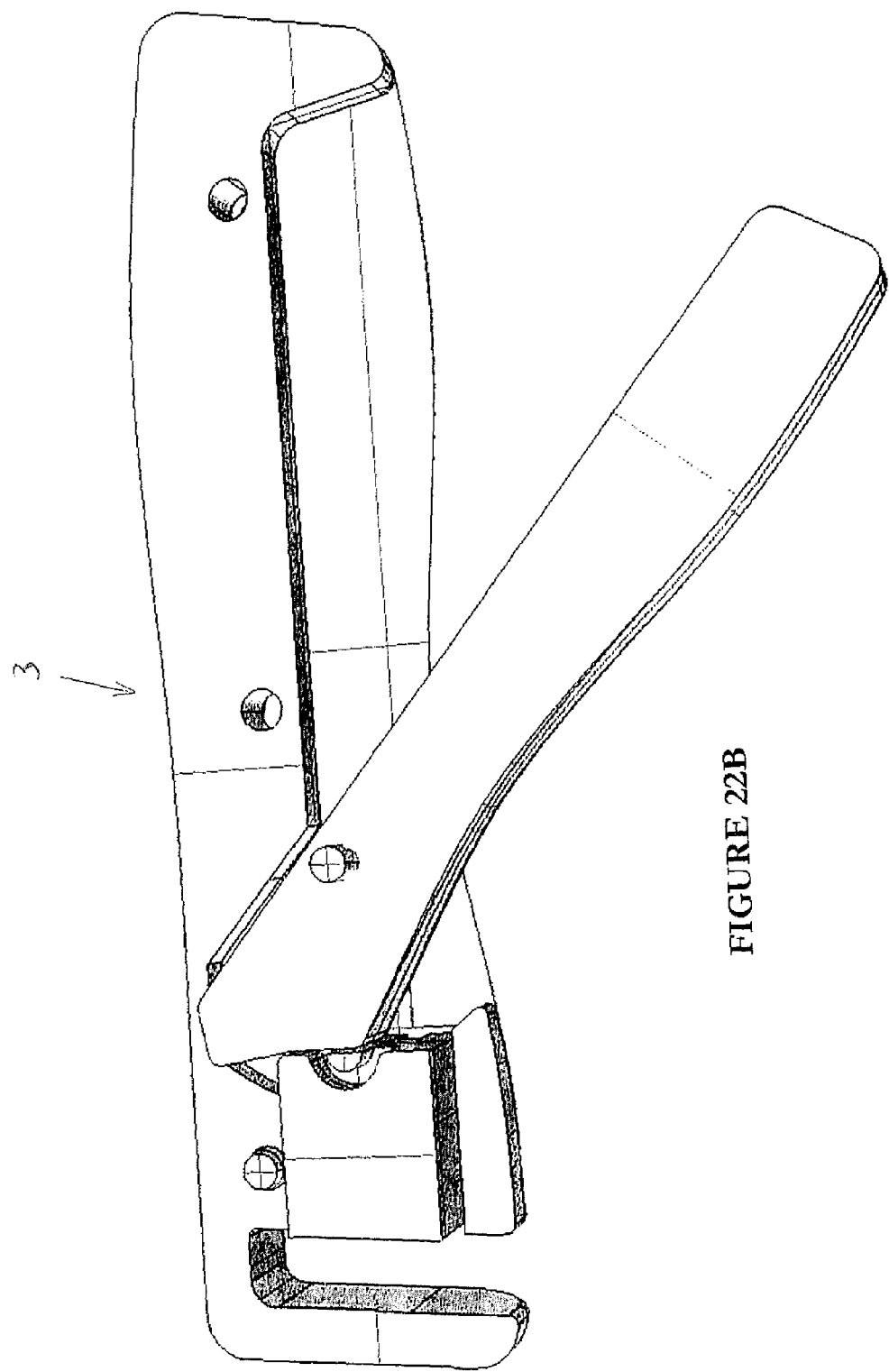

The nose region 20 of the lever is a transition point between two substantially stable conditions for the over centred spring action between the lever and the slide 13 such that when in the condition as shown in FIG. 22A there is stability that accords with gripping of a cookware component and there is no tendency for the lever to fall away and such that when in the condition as shown in FIG. 22B (the springs not being shown for ease of depiction) is stable in a condition able to be disengaged from a cookware vessel or to be inserted into such cookware vessel.

Figure 23:
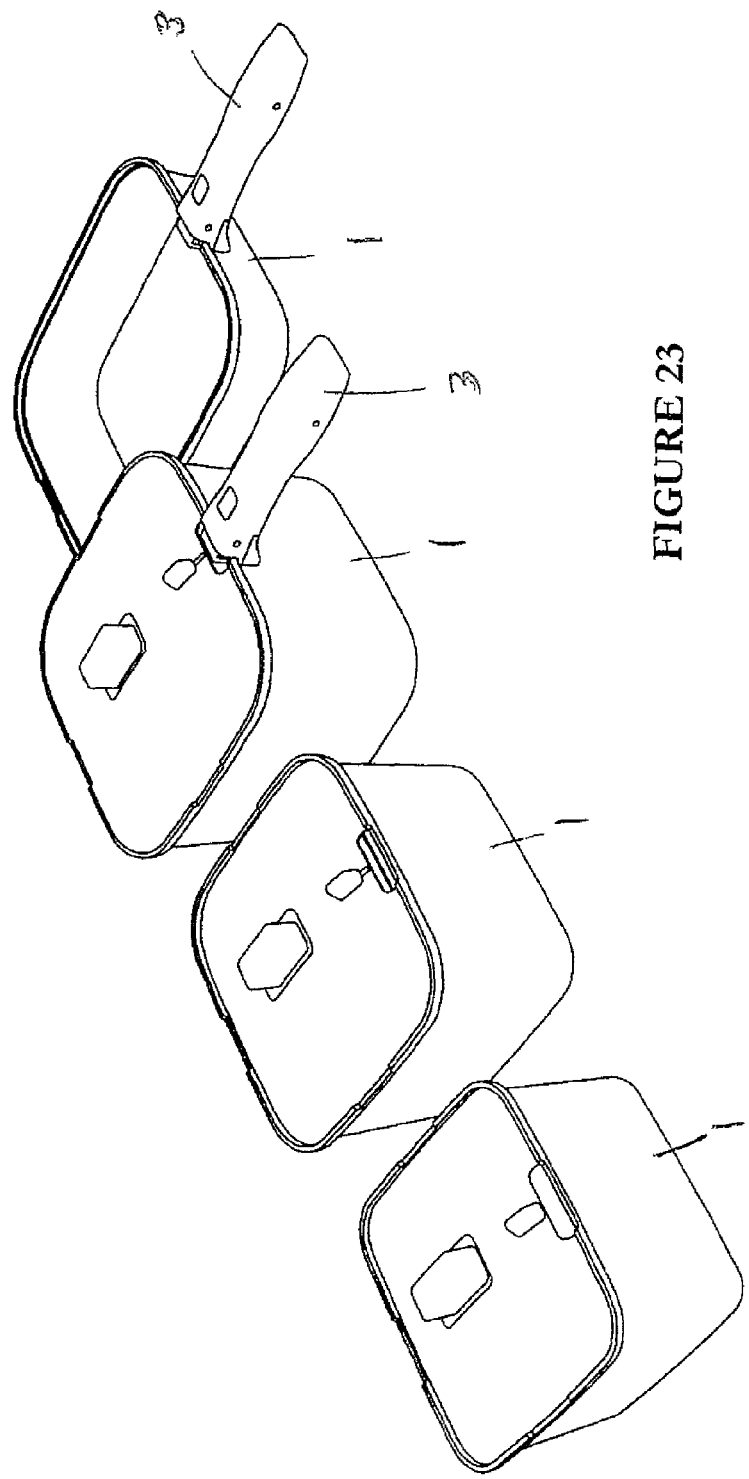
FIG. 23 is a set of cookware in accordance with the present invention having a lidding feature and showing two handles more or less as depicted in the preceding drawings fitted to two of the cookware items.
Figure 24:
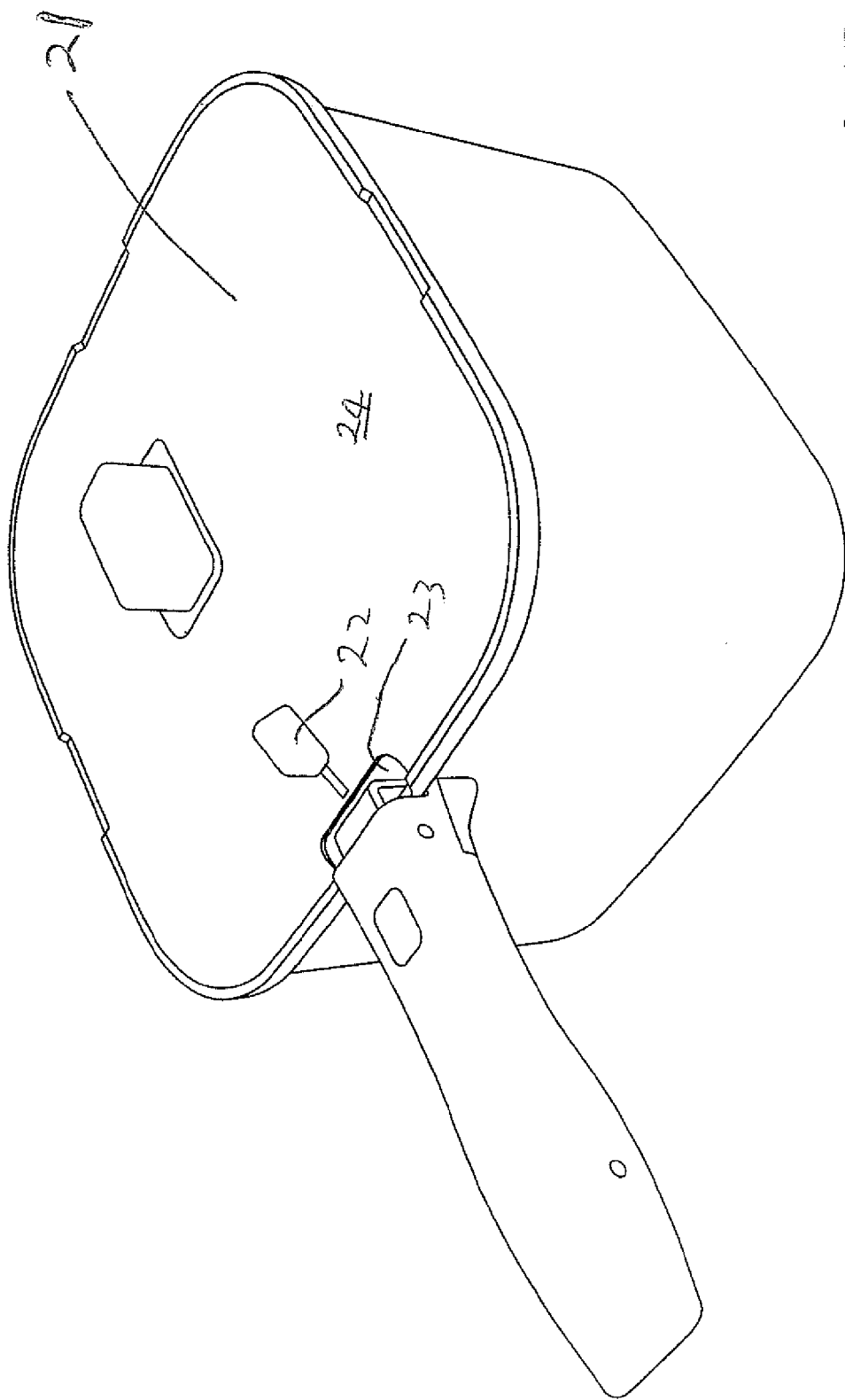
FIG. 24 is an enlarged view of one of the assemblies of FIG. 23.

FIGS. 23 and 24 show that the vessel 1, even when lidded, can be used in a vented or non-vented manner by a lid assembly.

Figure 25:
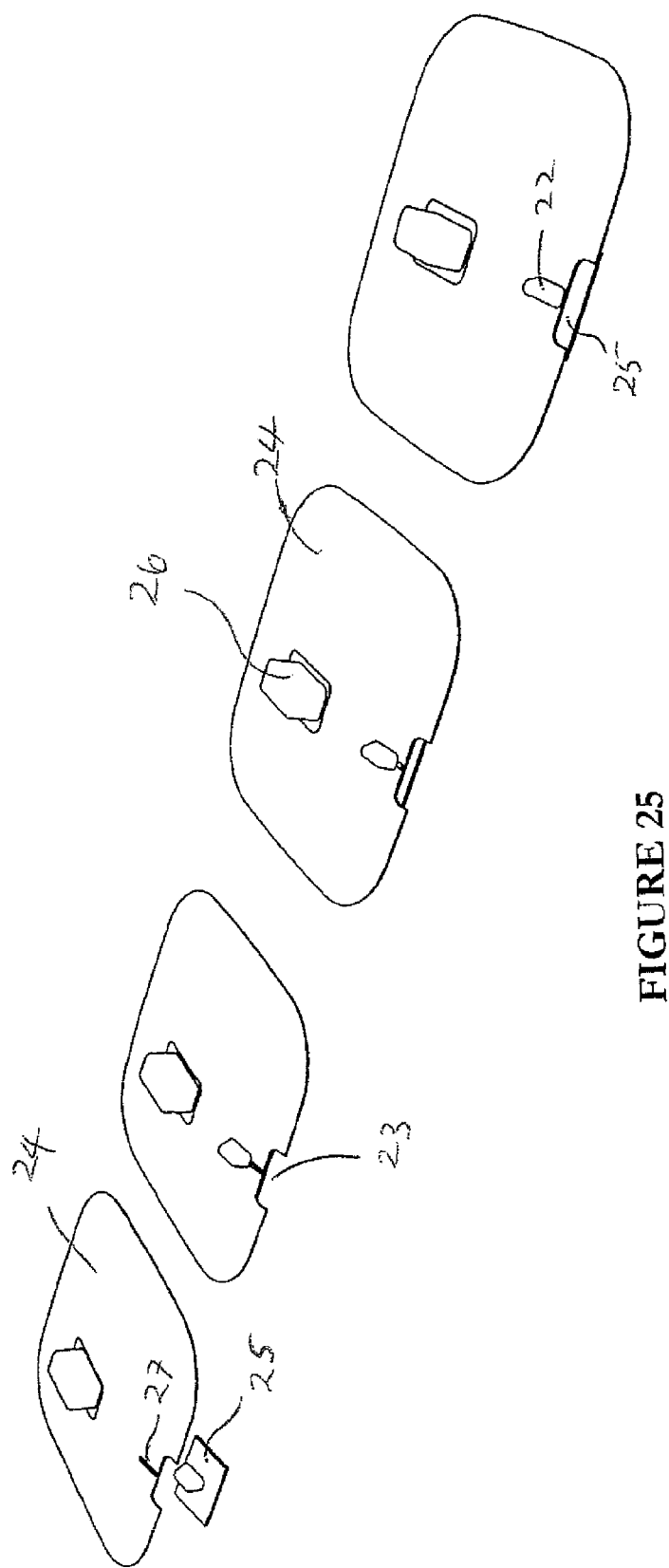
FIG. 25 shows a series of drawings of a lid showing the components thereof which allow a vent closing feature to be moved back and forth from a fully or near fully open or withdrawn condition to the perimeter of the general envelope of the lid (where it closes any venting) in order to vent and/or allow the fitment and/or retention (or the removal) of a handle and/or prevent venting.

FIGS. 25 show a lid assembly in accordance with the present invention where a lid assembly 21 has a slide (eg. of plastics material or a metal) actuable under the knob member 22 to encroach over the scalloped away region which is a relief 23 of the lid body proper 24 so as to reduce venting between the region of the handle (in that case departing somewhat from that previously described). As can be seen the knob 22 can be used to move the associated slide 25 from a condition that does not encroach upon the relief 23 to a position as in to the right in FIG. 25 where the whole of the relief 23 has been sealed by part of the slide 25.

In an alternative, preferred embodiment of the handle 3 a single spring 30 may be provided internally of the slidable member 13 to bias the slideably member towards the nose region 20 of the lever 14. FIG. 26A corresponds with a locked condition in which the jaw pair 12 and 13 are closer together. FIG. 26B corresponds with an unlocked condition in which the jaw pair 12 and 13 are further apart.

The lever 14 is articulatable between two stable conditions, corresponding to the locked and unlocked conditions of the jaw pair 12 and 13. A cam profile exists adjacent the nose region 20 of the lever 14 such that as the lever 14 pivots between its two stable conditions the position of the slide 13 is adjusted. The slide 13 on which the cam profile acts can be caused to slide, against the bias of the spring 30, to the locked condition of FIG. 26A, and can be biased to the unlocked condition of 26B when the cam profiled of the nose region moves to position shown in FIG. 26B.

A lever release button 31 may be provided to cause the lever 13 to pivot. Alternatively, the lever may be pushed down at its end region 32 to cause the pivoting.

A sleeve 33 may be provided on the inside of the fixed jaw 12 along with inserts 34 that may be provided on the end of the sliding member 13. The sleeve 33 and inserts 34 will engage with the vessel 1 when a handle is used to grip a vessel 1 and is in the locked condition. The sleeve and inserts may be made of silicon or any other suitable material.

With reference to FIG. 27 an exploded view of the preferred handle assembly is shown. The various parts and preferred materials for those parts are listed below:

3—handle body (nylon).
14—lever (nylon).
20—nose region (stainless steel).
13—sliding member of the jaw pair (stainless steel).
12—fixed jaw (stainless steel).
31—lever release button 31 (stainless steel)
33—fixed jaw sleeve (silicon)
34—sliding member inserts (silicon)

It should be appreciated that the handle 3 may be assembled in a different manner and from different components as shown with reference to FIG. 27. It should also be appreciated that the materials of the components may differ from what is listed above, as would be apparent to a person skilled in the art.

FIG. 28 shows the preferred handle 3 fully assembled.

Persons skilled in the art will appreciate how handle assemblies for example as shown in FIG. 28 can be engaged to the attachment location 2 of cookware vessels.

Figure 29:
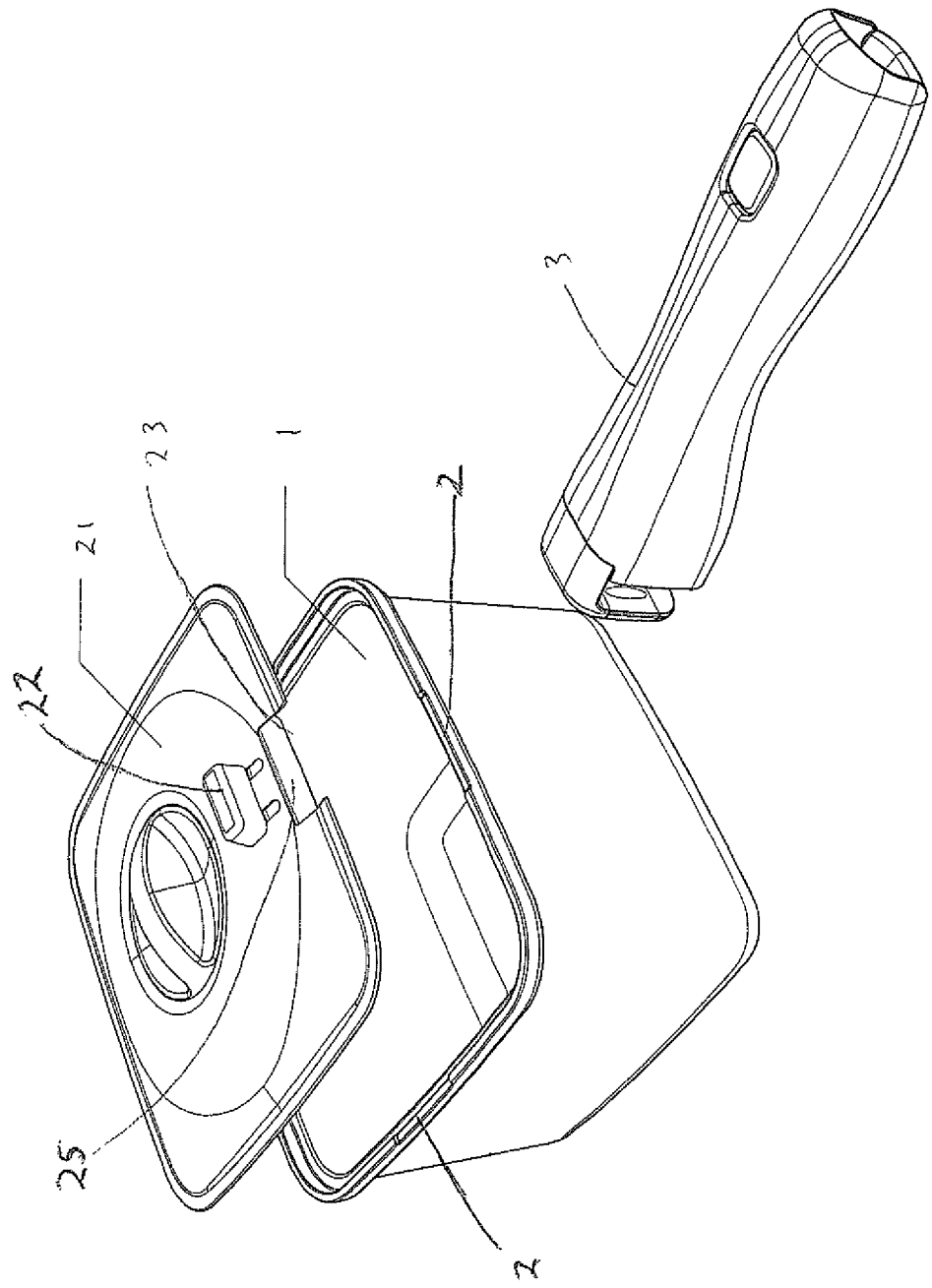
FIG. 29 shows an assembly view of a cookware vessel and an associated handle and lid.

FIG. 29 shows a cookware vessel 1 with an associated handle 3 and lid assembly 21. It should be appreciated that the handle 3 is suitable for attachment to any of the attachment locations 2 of the cookware vessel and indeed any attachment location 2 of a like cookware vessel irrespective of its size. Once a handle is located on a cookware vessel 1, the associated lid 21 may be placed onto the vessel such that the relief 23 corresponds with the attachment location 2 where the handle is located. The knob 22 can then be used to adjust the slide 25 depending on the amount of venting that is desired.

When no handle is attached to a cookware vessel, the slide 25 of a lid 21 can be adjusted to substantially close the relief 23. Such a lid 21 can then be placed on a corresponding vessel to substantially seal the vessel.

Figure 30:
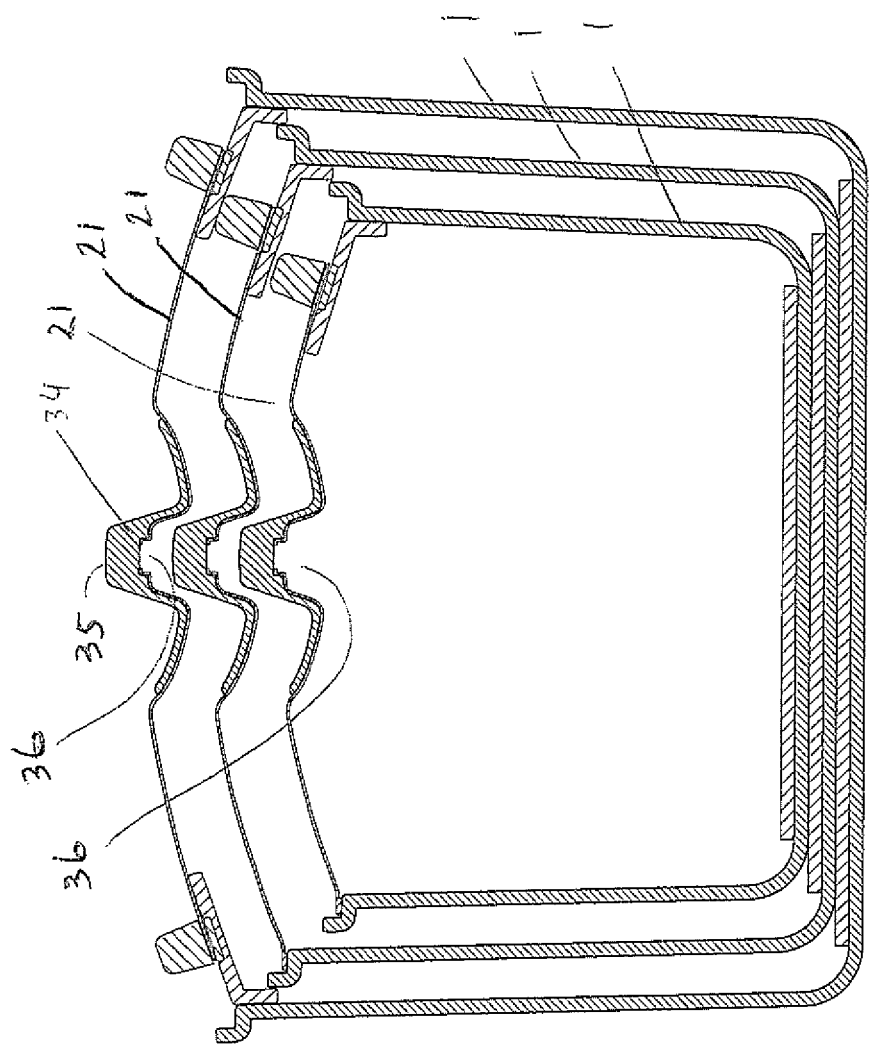
FIG. 30 shows a plurality of like lidded cookware vessels nesting for efficient stowage.
Figure 31:
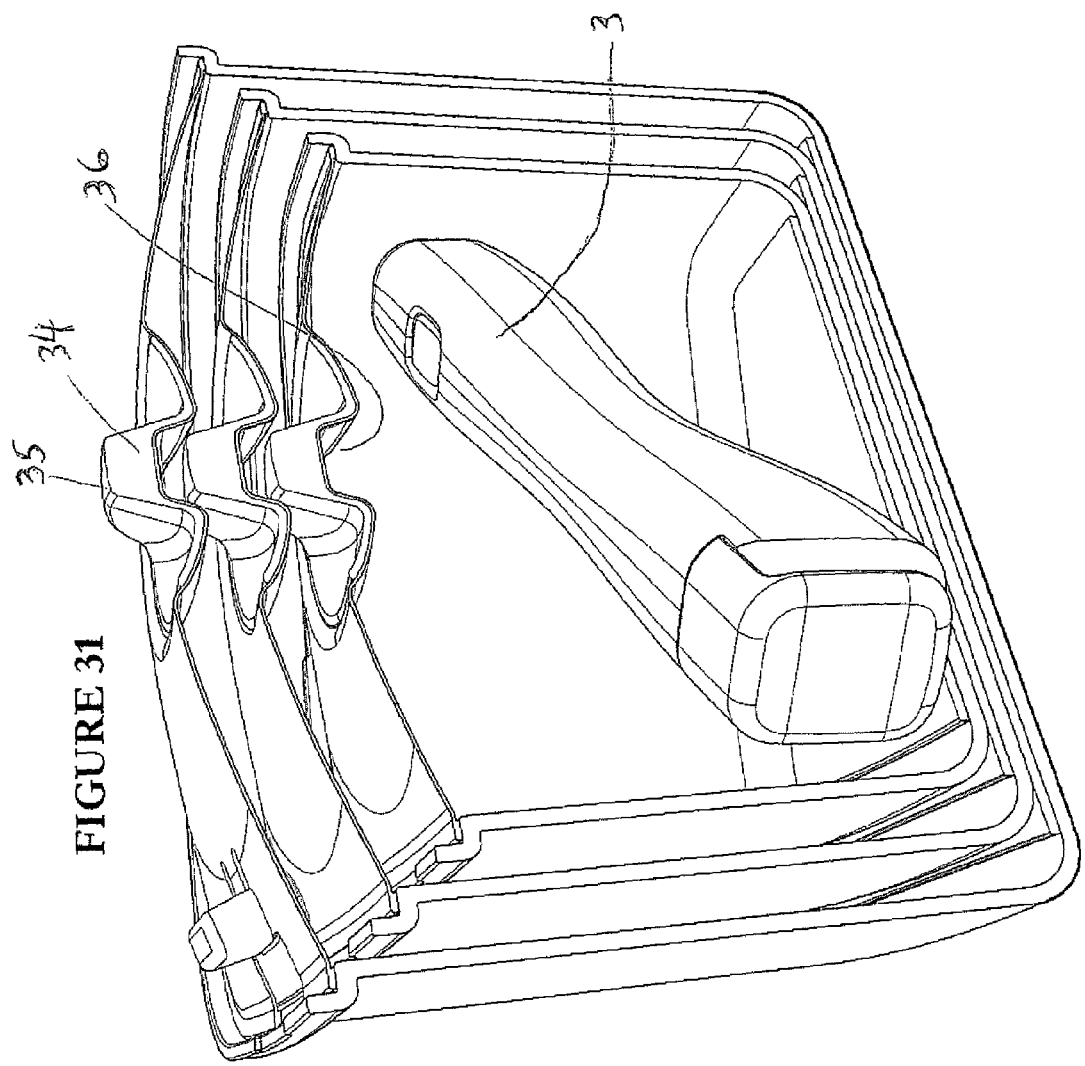
FIG. 31 shows a plurality of like lidded cookware vessels nesting for efficient stowage with a handle located inside the innermost cookware vessel.

With reference to FIGS. 30 and 31 it is evident that the cookware vessels, lid assembly 21 and handle of the present invention allow for efficient nesting of the various components. The cookware vessels 1 may sequentially nest, in order of their size, for efficient stowage. Even with their associated lid 21 located thereon, the lidded vessels can nest efficiently as shown in FIGS. 30 and 31.

To enable efficient lidded nesting of the cookware vessels, the lids 21 may be provided with handles 34 that define upwardly extending grippable regions 35 and hollow regions 36 located substantially below the grippable regions 35. Preferably the hollow regions 36 of the handles 34 are complementary with the form of the main lid body when a handle is attached thereto. In this respect, the main lid body may have a convex portion centrally of a concave portion. The convex portion being suitable for accepting the hollow region 36 of a handle when such a handle is attached thereto.

When the lidded cookware vessels are sequentially nested, as shown in FIGS. 30 and 31, the grippable region 35 of an inner nested vessel may be at least partially received in the hollow region 36 of a more outwardly nested vessel. This may reduce interference between the lids and therefore allows for efficient nesting of a set of cookware vessels and their associated lids.

The handle 3 may fit within the most inwardly nested vessel as shown in FIG. 31.

It is envisaged that sets of two or more cookware vessels may be provided with correspondingly sized lids and a handle. Such a set has the benefit whereby the handle can be used on any of the vessels of the set, and the lidded vessels may nest for efficient stowage as shown in FIGS. 30 and 31. Such a cookware set lends itself to situations where storage space is at a premium such as in apartments, boats, caravans etc.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A cookware assembly or set comprising or including:
   at least one rimmed cookware vessel of a substantially square peripheral exterior and interior form when viewed in plan, wherein the vessel has a visible attachment location substantially midway along at least one side of the vessel, said attachment location being a non-perforate relief in a rim of the vessel
   a handle with both proximal and distal end regions, having a pair of relatively moveable jaw elements at the proximal region for selectively facilitating engagement to and disengagement from said vessel at said attachment location,
   the engagement being such that a first jaw of the jaw pair locates substantially inside of and against an interior surface of the vessel and a second jaw of the jaw pair locates substantially outside of and against an exterior surface of the vessel, one of said jaws being fixed relative to the distal end region of the handle and the other being slidable relative to the fixed jaw,
   said attachment location being recessed from a surrounding portion of the rim, such that the handle, once engaged with the vessel within the recess of the attachment location, is restricted from moving along the rim of the vessel,
   and further comprising at least one lid assembly able to fit on the cookware vessel and to close, or at least substantially close, the cookware vessel,
   and wherein said handle, once engaged, at least in part intrudes inwardly of a general envelope of the lid when viewed in plan when the lid is fitted on the vessel,
   said lid assembly comprising
   a lid body, said lid body defining a vent aperture that extends inwardly from the general envelope of the lid body, wherein an inwardly intruding part of said handle, once the handle is engaged at the attachment location, can be accommodated within the vent aperture when the lid is fitted to the vessel.

2. A cookware assembly or set as claimed in claim 1 wherein the cookware vessel is of a form to enable nesting at least in part with a like vessel of a smaller or larger size, if not also partially nestable with one of the same size.

3. A cookware assembly or set as claimed in claim 1 wherein the cookware vessel is of a form to enable sequential nesting with a like vessel of a smaller or larger size, one within the other in order of their size, even with a corresponding lid located on each nested vessel.

4. A cookware assembly or set as claimed in claim 3 wherein each lid has a handle located substantially centrally of the lid body and has a grippable region extending upwardly substantially beyond the lid body, and a hollow region located below the grippable region, wherein the hollow region is dimensioned so that it can receive at least a portion of the grippable region of another like lid placed beneath so as to prevent interference between the lid handle and another lid when a plurality of cookware vessels are sequentially nested with their lids located thereon.

5. A cookware assembly or set as claimed in claim 1 wherein the jaw pair are shaped such that they are complementary with the attachment location to lock the handle to the vessel in a rigid, weight bearing manner.

6. A cookware assembly or set as claimed in claim 1 wherein the handle comprises or includes:
   a pair of jaw elements at a proximal region of the handle,
   an actuator to adjust the relative position of the pair of jaw elements,
   wherein the relative position of the jaw elements facilitates attachment of the handle to an attachment location provided as a relief in the rim of a cookware vessel such that a first jaw of the jaw pair locates substantially inside the vessel and a second jaw of the jaw pair locates substantially outside of the vessel.

7. A cookware assembly or set as claimed in claim 6 wherein the position of one or both jaws of the jaw pair may be adjusted between a locked condition where the jaws are closer together than a further apart, unlocked condition.

8. A cookware assembly or set as claimed in claim 7 wherein the actuator is a lever to cause adjustment of the jaws between the locked and unlocked conditions.

9. A cookware assembly or set as claimed in claim 8 wherein the lever can articulate between at least two stable conditions, one of which positions corresponds to the locked condition of the jaw pair, the other corresponding to the unlocked condition of the jaw pair.

10. A cookware assembly or set as claimed in claim 9 wherein the articulation of the lever causes a sliding and/or otherwise guided member as a second jaw element to move relative to a more proximal fixed jaw element.

11. A cookware assembly or set as claimed in claim 10 wherein the lever has a cam profile that engages the sliding member, the arrangement being such that, via articulation of the lever, the cam profile can be pivoted outwardly from a condition that stably holds the sliding member in a locked condition closer to the first mentioned jaw yet allows the retreat of the sliding member to an unlocked condition under the action of a bias when the cam is moved or urged away from that condition.

12. A cookware assembly or set as claimed in claim 11 wherein the sliding member is biased towards the cam profile of the lever.

13. A cookware assembly or set as claimed in claim 6 wherein the jaw pair are shaped such that they are complementary with the attachment location of the cookware vessel to lock the handle to the vessel in a rigid, weight bearing manner.

14. A cookware assembly or set as claimed in claim 1, wherein:
   the at least one cookware vessel is a plurality of cookware vessels, configured to be serially nested one within the other, in order of their size; and
   the at least one lid assembly is a plurality of lid assemblies, wherein each lid assembly further comprises:
   (a) a lid handle located substantially centrally of the lid body to provide a grippable region extending upwardly substantially beyond any part of the lid body, and
   (b) a hollow region of the lid body located below the grippable region able to at least partly receive the grippable region of another one of the lids
   the assembly or set being configured such that when the cookware vessels are serially nested, each vessel can seat its corresponding lid of the nested lids;

and wherein said selectively attachable handle is able to be held inside of the smallest of the cookware vessels when the vessels are serially nested.

15. A cookware assembly or set as claimed in claim 1 wherein said lid further comprises a moveable member carried by the lid, able to close over the vent relief when the handle is not so engaged so as to substantially weal the vessel.

16. A cook assembly or set as claimed in claim 1 wherein said lid further comprises a slideable member carried by and slideable relative to the lid body, able to close over the vent relief when the handle is not so engaged so as to substantially seal the vessel.

17. A cook assembly or set as claimed in claim 1 wherein said lid further comprises a moveable member carried by the lid, and able to encroach over the vent relief to reduce venting during cooking.

\* \* \* \* \*